United States Patent [19]

Peterson et al.

[11] Patent Number: 5,468,037
[45] Date of Patent: Nov. 21, 1995

[54] DUAL PIVOT PICKUP TAILGATE

[76] Inventors: Francis C. Peterson, 807 College, Prescott, Wis. 54021; Jerome A. Grunstad, 3872 - 67th St. East, Inver Grove Heights, Minn. 55076-2232; Leo F. Wildgen, 9431 - 10th Avenue South, Bloomington, Minn. 55420

[21] Appl. No.: 888,188

[22] Filed: May 26, 1992

[51] Int. Cl.⁶ .................................................. B62D 35/00
[52] U.S. Cl. ........................................ 296/57.1; 296/180.1
[58] Field of Search ......................... 296/57.1, 50, 51, 296/56, 180.1

[56] References Cited

U.S. PATENT DOCUMENTS

| | | | |
|---|---|---|---|
| 4,475,759 | 10/1984 | Wine | 296/50 X |
| 4,585,265 | 4/1986 | Mader | 296/180.1 X |
| 4,652,035 | 3/1987 | Austin, Jr. | 296/180.1 X |
| 4,778,213 | 10/1988 | Palmer | 296/57.1 X |
| 4,884,838 | 12/1989 | Slater | 296/57.1 X |
| 5,133,584 | 7/1992 | McCleary | 296/57.1 X |

FOREIGN PATENT DOCUMENTS 459395  1/1937  United Kingdom ................. 296/51

*Primary Examiner*—Russell D. Stormer
*Assistant Examiner*—Joseph D. Pape

[57] ABSTRACT

A multi-position tailgate having a movable gate panel. The gate panel is pivotally mounted in a gate frame. The gate frame is hinged to the rear edge of the cargo bed. The gate panel is hinged to the top of the gate frame. Rotation of panel about the two axis permits the gate panel to be positioned parallel to the cargo bed.

6 Claims, 6 Drawing Sheets

DUAL PIVOT PICKUP TAILGATE

FIELD OF THE INVENTION

The invention relates to a multiple position tailgate for use with a pick-up truck or other utility vehicle.

BACKGROUND OF THE INVENTION

The tailgate which closes the cargo bed of a pick-up truck causes significant aerodynamic drag in the vertical or closed position. To reduce drag many users remove the tailgate or drive with the tailgate in the horizontal or open position. Multiple position tailgates which address aerodynamic efficiency are known. See for example:

U.S. Pat. No. 4,585,265 to Mader which teaches a linkage which permits the traditional tailgate to be mounted in a horizontal position over the bed of the cargo area.

U.S. Pat. No. 4,475,759 Wine teaches a pair of brackets to permit remounting of the tailgate in a generally horizontal position between the sides of the pick-up cargo area.

U.S. Pat. No. 4,902,066 to Norman teaches a louvered tailgate which improves the aerodynamics of the pick-up truck in comparison to a conventional tailgate.

BRIEF SUMMARY OF THE INVENTION

In contrast to the prior art, the tailgate of the present invention has a generally U-shaped gate frame which carries a pivotally mounted gate panel. The gate frame is hinged to the rear edge of the bed of the cargo area, while the gate panel is pivotally mounted in the gate frame. These two structures make up a dual pivot assembly. With the gate panel nested into the gate frame, the gate frame can be raised into the vertical and closed position to emulate a conventional tailgate. With the gate panel released and rotated out of the gate frame the gate panel may be positioned generally horizonal above the bed, across the sides of the pick-up cargo area, in an aerodynamically efficient position. In this position the gate panel engages panel brackets which define the angular orientation of the gate panel with respect to the floor of the bed. The latch linkages located in the gate panel and gate frame engage the side posts of the pick-up bed to hold both the gate frame and the gate panel into position.

BRIEF DESCRIPTION OF THE DRAWINGS

Throughout the several figures of the drawing identical reference numerals refer to identical structure wherein.

DETAILED DESCRIPTION OF THE INVENTION

Figure 1:
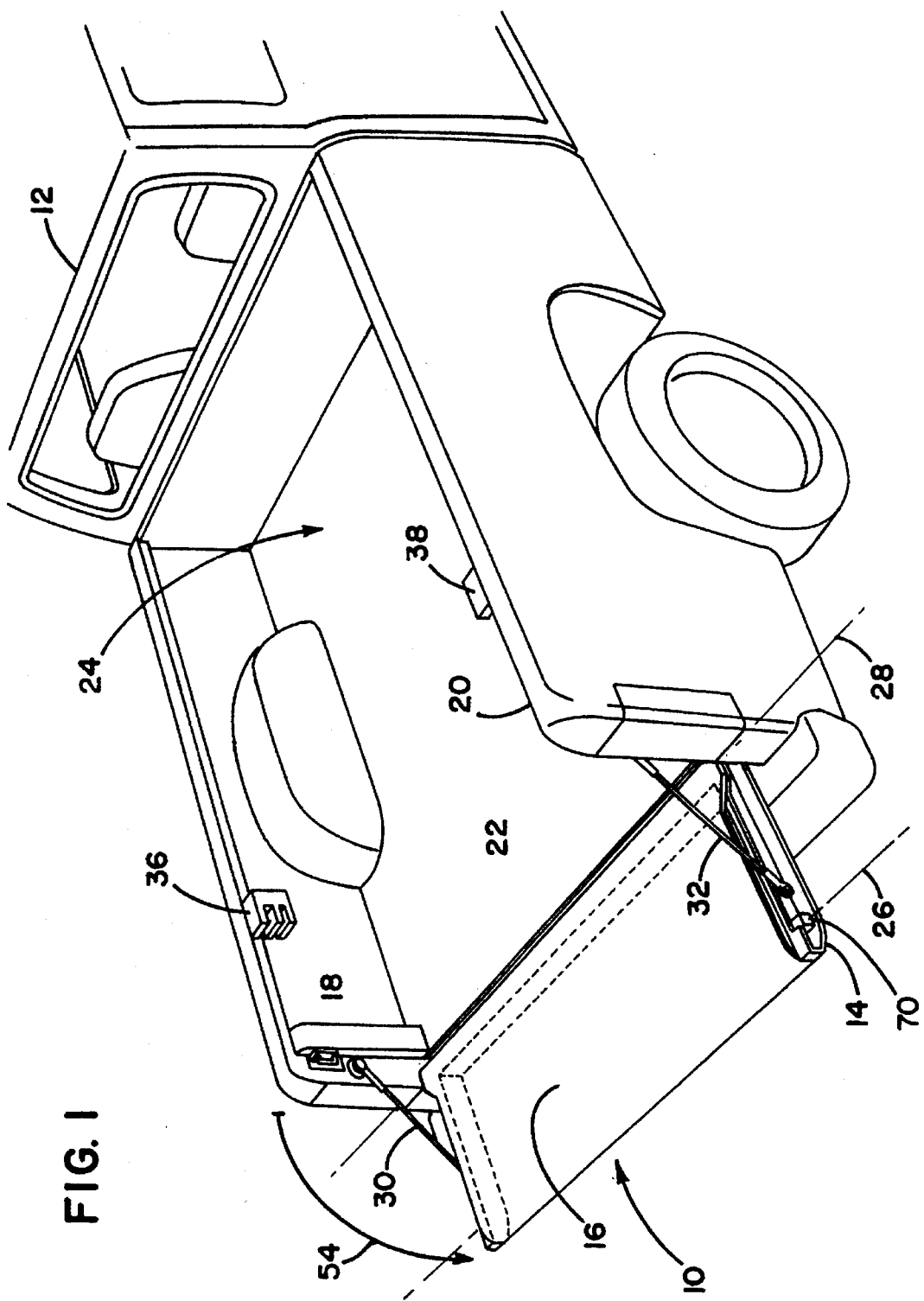
FIG. 1 is perspective view showing the tailgate assembly in the open or loading position.

FIG. 1 shows the tailgate assembly 10 mounted on a pick-up truck 12. The tailgate assembly 10 includes a gate frame 14 and a gate panel 16. The pick-up truck 12 includes a cargo area 24 defined in part by side 18 and side 20 and bed floor 22. The tailgate assembly 10 has a hinge mechanism 26 to pivotally mount the tailgate assembly 10 along a gate hinge axis 28 at the rear of the cargo area 24. A pair of cables 30 and 32 extend from the sides 18 and 20 to the gate frame 14 limit the motion of the tailgate assembly 10 about the gate frame hinge axis 28 and together they position the tailgate assembly 10 into the open loading position depicted in FIG. 1. Opening this tailgate assembly is indicated by path 54 which corresponds to partial rotation of the gate frame 14 about gate frame hinge axis 28.

Figure 2:
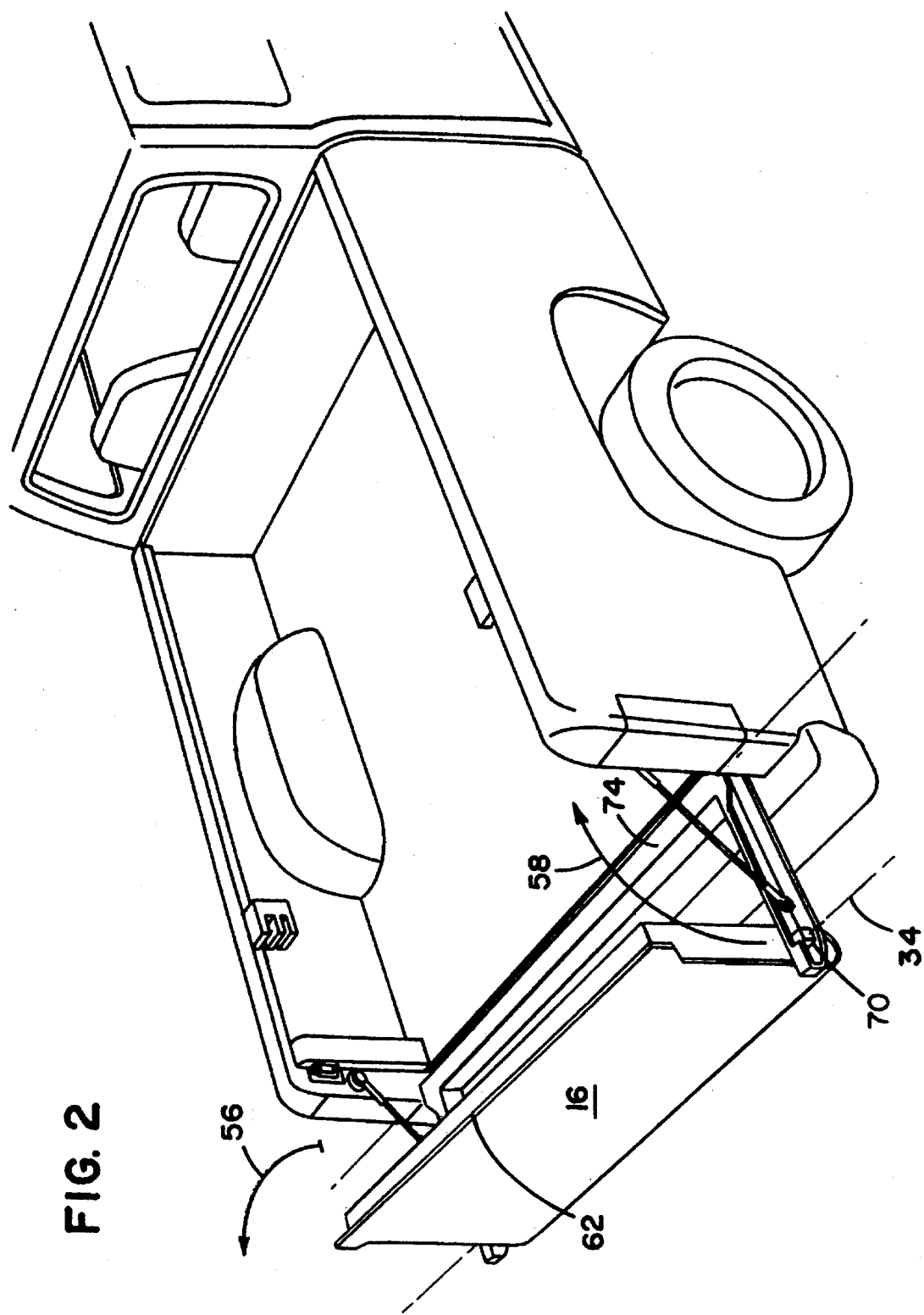
FIG. 2 is a perspective view showing the tailgate assembly with the gate panel pivoted into an upright position.

FIG. 2 shows the gate panel 16 rotated out of engagement with the gate frame 14, about a panel axis 34. This motion is indicated by path 56. This intermediate position prepares the panel for movement into the horizontal and closed position depicted in FIG. 3 and indicated in FIG. 2 by motion along path 58.

Figure 3:
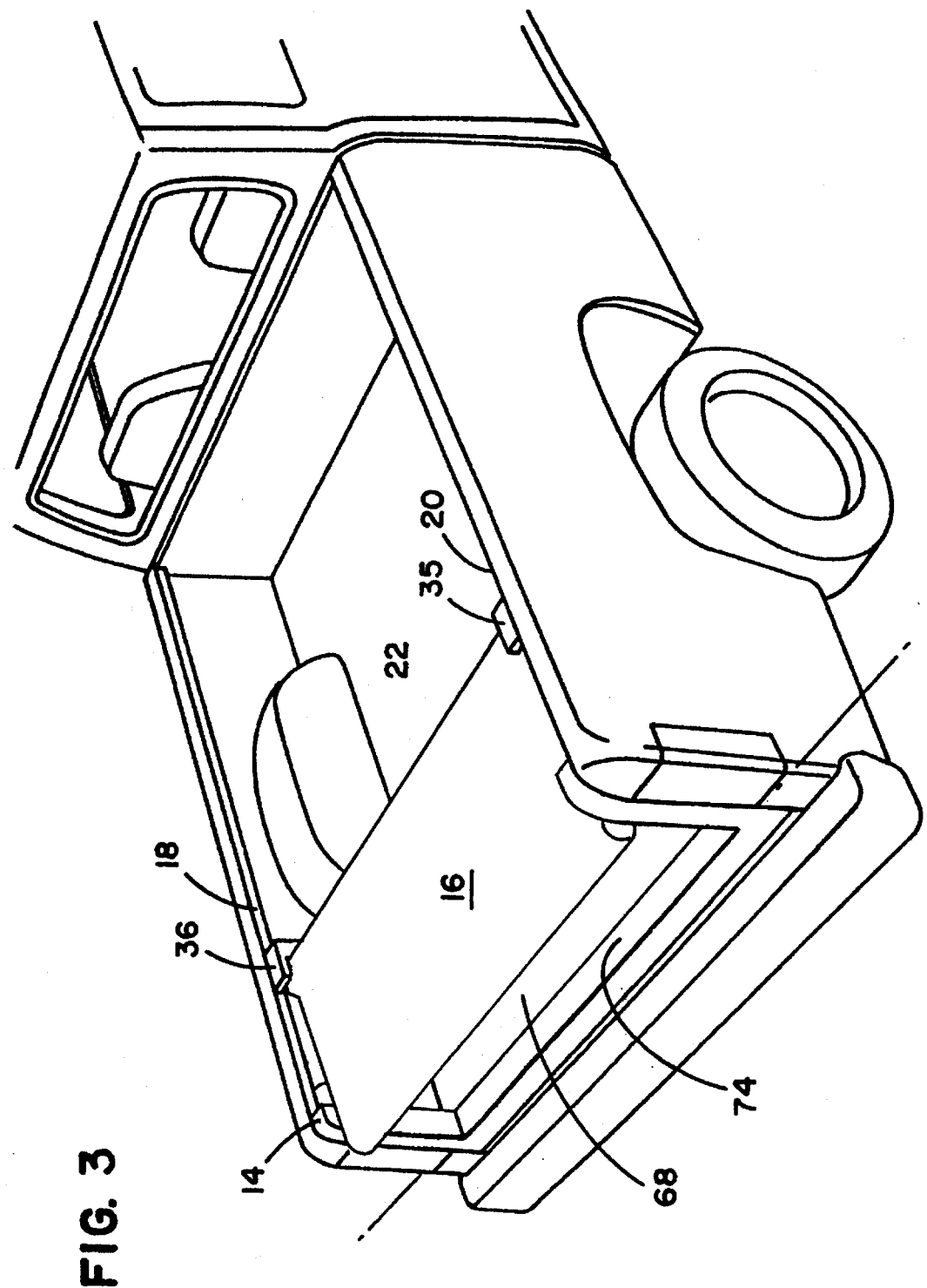
FIG. 3 is a perspective view showing the tailgate assembly with the gate panel in the horizontal position above the pick-up bed.

FIG. 3 shows the gate panel 16 engaged with the first panel bracket 36 located on side 18 and the second panel bracket 35 located on side 20. The gate panel 16 has engaged the two brackets which defines the angle of the panel 16 with respect to the bed 22. It is preferred to have several positions defined by the brackets. It is expected that one position will be determined empirically to minimize aerodynamics drag. While an alternate position may facilitate generation of down-force at the rear of the truck body at highway speed. Yet another position may be useful for carrying certain loads in the cargo area.

Figure 4:
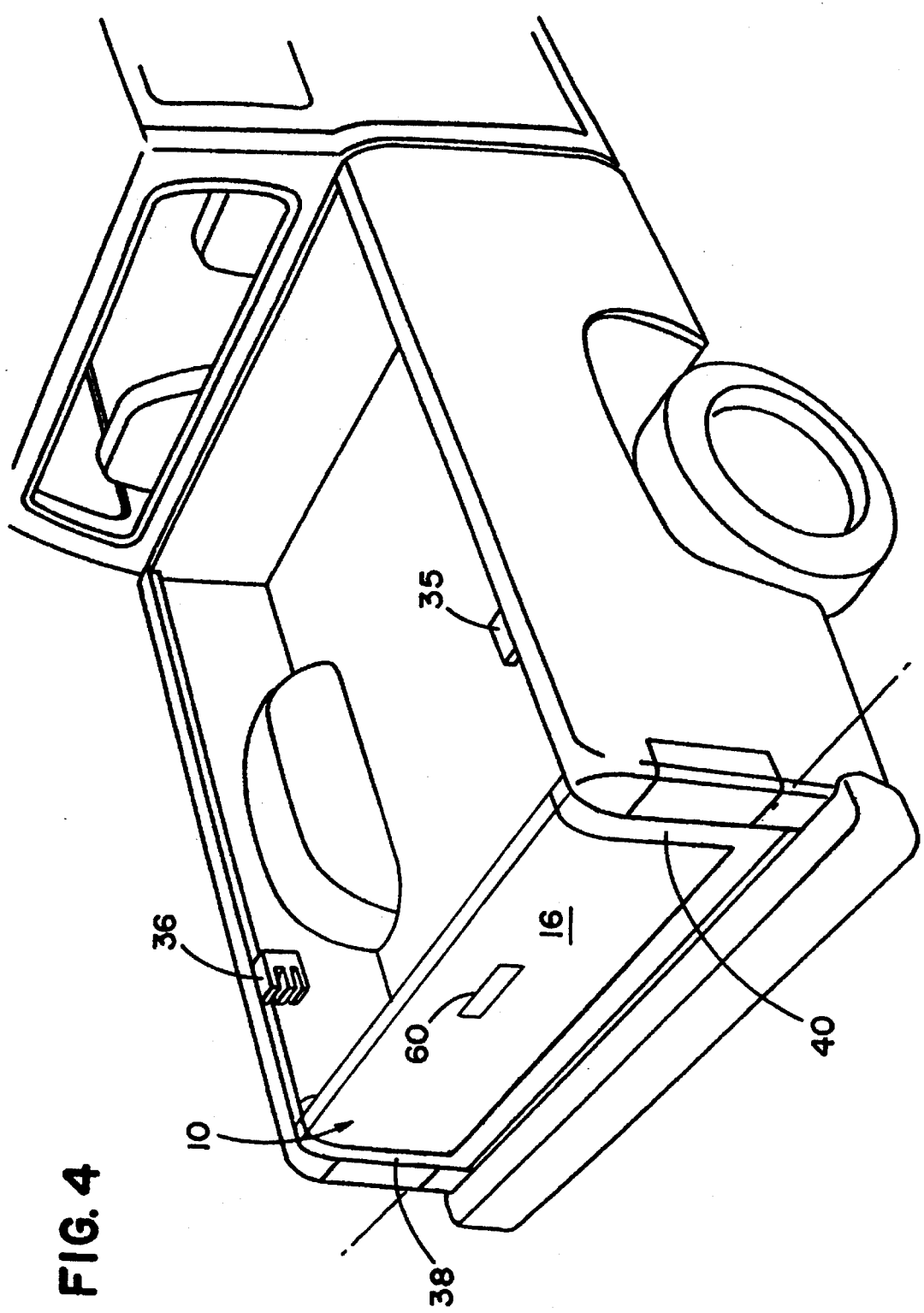
FIG. 4 is a perspective view showing the tailgate assembly with the gate panel and gate frame in the closed position.

FIG. 4 shows the tailgate assembly 10 in the closed position where the gate panel 16 blocks off the gate frame 14 and tailgate assembly 10 presents the appearance and function of a traditional pick-up tailgate.

The dimensions to the gate frame 14 and gate panel 16 are generally not critical. It is desirable that the width of the first frame arm 38 and second frame arm 40 be relatively narrow so that standard sized plywood sheets and other conventionally sized building materials can be loaded over the gate frame lower edge 74 through the open gate as seen in FIG. 3. This schema also maximizes the aerodynamic benefits as well.

Figure 6:
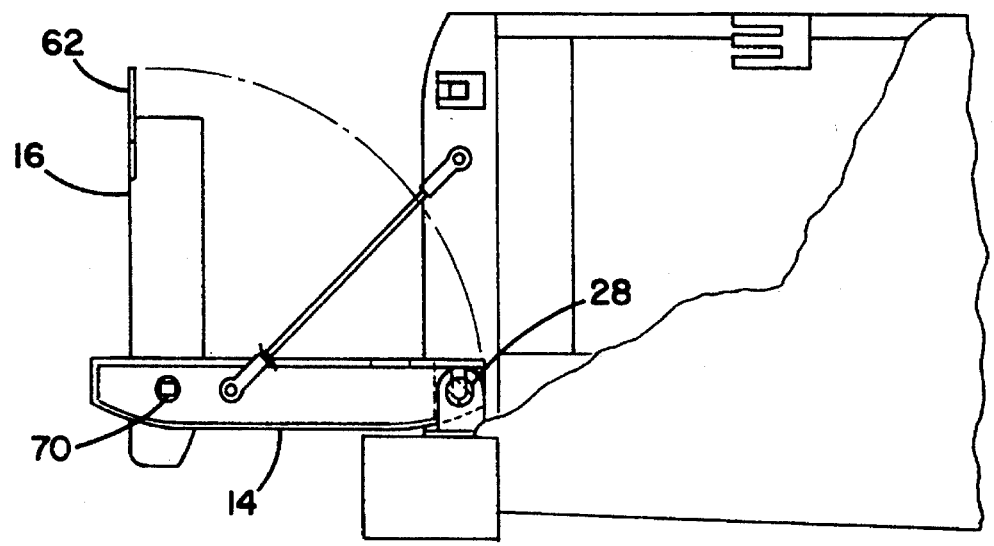
FIG. 6 is a schematic cross section showing the tailgate assembly with the gate panel in the upright position.

In the embodiment shown in the drawing the flange 62, best seen on FIG. 2 and FIG. 6, on the gate panel 16 prevents the gate panel 16 from swinging through the gate frame 14. The gate frame 14 walls could be tapered to accept the panel into mating engagement and thereby eliminate the flange element 62 and perhaps enable the tailgate assembly to accept greater loading in the open position. In a similar fashion the gate panel is shown as a solid sheet and the gate frame aperture 68 (in FIG. 3) is shown as a void. It may be desirable to span the aperture 68 with a mesh material to prevent loose objects in the bed from falling out of the cargo area 24. Such a mesh material could be incorporated into the gate frame 14 structure.

Figure 5:
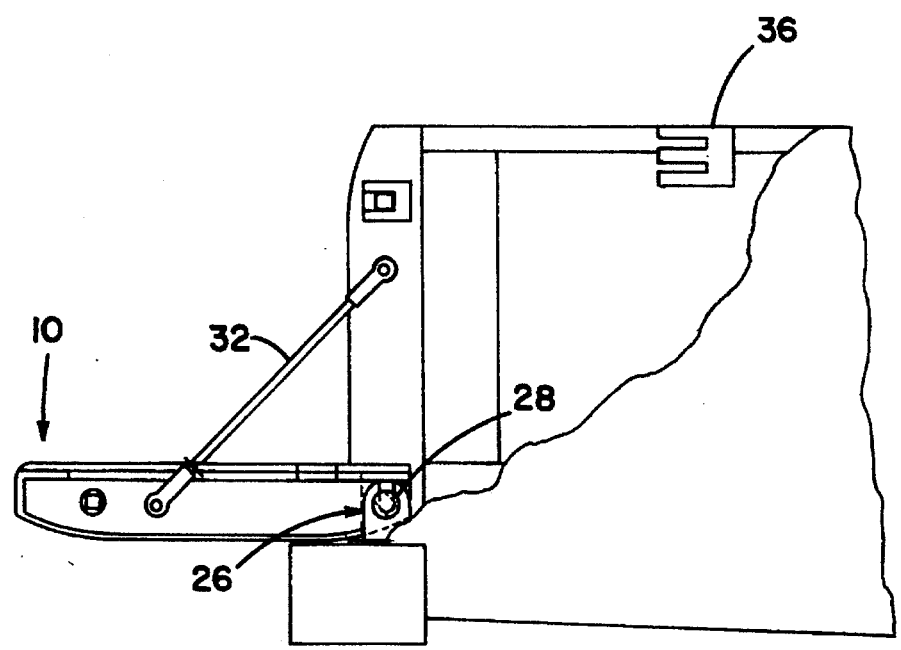
FIG. 5 is schematic cross section showing the tailgate assembly in the open or loading position.

FIG. 5 shows the tailgate assembly in the open position supported by cable 32. The hinge pin mechanism 26 is preferably slotted to permit tool-less removal of the tailgate assembly from the pickup truck bed. This hinge structure 26 together with the cables may form means for limiting the rotation in the counterclockwise direction of the gate frame 14 about the hinge axis 28.

FIG. 6 shows the gate panel 16 rotated counterclockwise to elevate the panel into a nearly vertical position. In this embodiment the panel axis 34 is concentric with the latch mechanism 70.

It is preferred and convenient, but not necessary, to have the pivot axis concentric with the latch mechanisms. This arrangement permits reduction in complexity since the latch lock arms may be extended to form the journal for the panel axis 34. In this embodiment the latch mechanism 70 which releases the tailgate swings with the gate panel. and a single latch mechanism is all that is required to position the gate panel 16 in the open position depicted in FIG. 3 or the closed position depicted in FIG. 4.

In this connection the handle 60 (FIG. 4) may be operated to withdraw the latch mechanisms from the sides 18 and 20 to permit the tailgate assembly to drop to the open position shown in FIG. 1 and to reposition the gate frame 14 in the vertical position seen in FIG. 3

Figure 7:
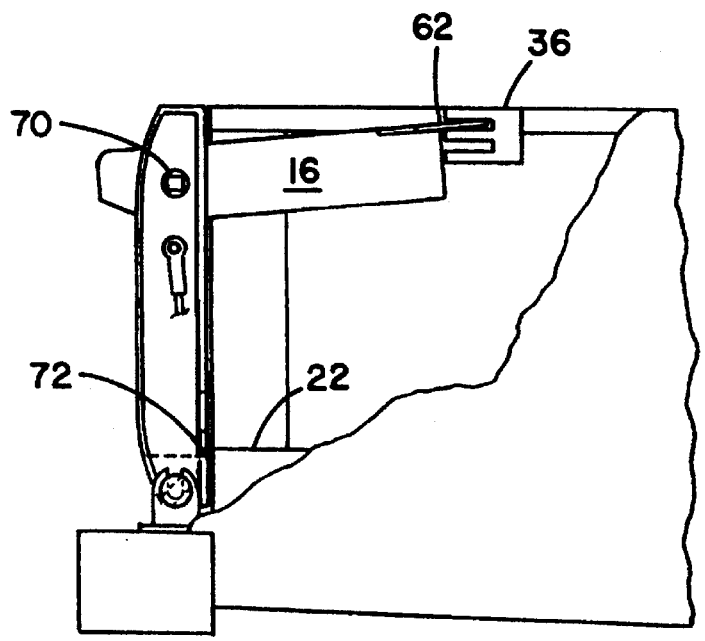
FIG. 7 is a schematic cross section showing the gate panel in the generally horizontal position above the bed of the cargo area; and, FIG. 8 is a schematic cross section showing the tailgate assembly in the closed position.

FIG. 7 shows the gate panel 16 in a substantially horizontal position above the bed 22, with the flange 62 inserted into the visible side bracket 36.

Figure 8:
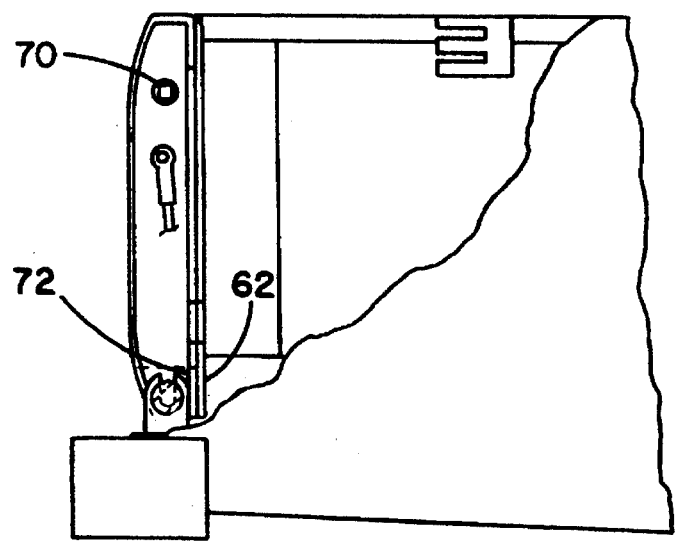

FIG. 8 shows the tailgate assembly 10 returned to the closed position and shows that the latch mechanism 70 returns to the same position when the gate frame is in the vertical position. FIG. 8 also shows that the flange 62 is trapped behind the rear wall 72 of the bed 22 when the tailgate assembly 10 is in the closed position.

We claim:

1. A tailgate assembly for use with a utility vehicle having a cargo area, having two sides, and a bed floor, said tailgate comprising:

gate frame means for carrying gate panel means;

mounting means coupled to said gate frame for mounting said gate frame proximate said bed floor, and for permitting partial rotation about a first gate frame hinge axis, said hinge axis being fixed and being located substantially at the level of said bed floor;

said gate panel means pivotally mounted for rotation about a second gate frame hinge axis, said second axis being parallel to said first axis;

whereby rotation of said gate panel means about said second axis coupled with rotation of said gate frame means about said first axis can move said gate panel means from a position orthogonal to said bed to a second position substantially parallel to said bed and located above said bed.

2. A tailgate assembly for use with a utility vehicle of the type having a cargo area of the type having two sides, and a bed floor, said tailgate comprising:

a gate frame having a lower edge, and having a first arm and having a second arm;

mounting means coupled to said gate frame proximate said lower edge for mounting said gate frame proximate said bed floor, for partial motion about a first gate frame hinge axis;

a gate panel extending between said first arm and said second arm and pivotally mounted for rotation about a second movable gate panel axis, said second axis being parallel to said first axis;

whereby rotation of said gate panel about said second axis coupled with rotation of said gate frame about said first axis can move said gate panel from a vertical position orthogonal to said bed to a second position substantially parallel to said bed and located above said bed.

3. A tailgate assembly for use with a utility vehicle of the type having a cargo area of the type having two sides, and a bed floor, said tailgate comprising:

a substantially U-shaped gate frame having a lower edge, and having a first arm and having a second arm;

a hinge mechanism coupled to said gate frame proximate said lower edge for mounting said gate frame proximate said bed floor, for limited counterclockwise motion about a first fixed gate frame hinge axis;

a gate panel extending between said first arm and said second arm and pivotally mounted for rotation about a second movable gate panel axis, said second axis being parallel to said first axis;

whereby counterclockwise rotation of said gate panel about said second axis coupled with clockwise rotation of said gate frame about said first axis can move said gate panel from a first vertical position orthogonal to said bed to a second position substantially parallel to said bed and located above said bed.

4. The tailgate assembly of claim 3 further including latch mechanism means located within said gate panel for latching said gate frame to said sides.

5. The tailgate assembly of claim 4 wherein said latch means is substantially concentric with said panel axis.

6. The tailgate assembly of claim 3 further comprising bracket means located on said sides adjacent said gate panel for locating said panel with respect to said bed.

* * * * *

UNITED STATES PATENT AND TRADEMARK OFFICE
CERTIFICATE OF CORRECTION

PATENT NO. : 5,468,037

DATED : November 21, 1995

INVENTOR(S) : Francis C. Peterson, Jerome A. Grunstad, and Leo F. Wildgen

It is certified that error appears in the above-identified patent and that said Letters Patent is hereby corrected as shown below:

Title page, item [73] Assignee: Phillips Plastics Corporation, Prescott, Wisconsin 54021--
insert -- attorney, agent or firm-- Merchant,Gould,Smith,Edell,Welter & Schmidt In column 1, line 60, before the word "schematic", please insert --a--

In column 2, line 15, after the numeral "14", please insert --to--

In column 2, line 52, before "FIG. 2", please delete the word "on", and insert therefor --in--

In column 3, line 13, after the word "panel", please delete --.--

Signed and Sealed this

Nineteenth Day of March, 1996

Attest:

BRUCE LEHMAN

Attesting Officer  Commissioner of Patents and Trademarks